Patented Jan. 23, 1934

1,944,412

UNITED STATES PATENT OFFICE 1,944,412

CHELIDAMIC ACID DERIVATIVE

Max Dohrn, Berlin-Charlottenburg, and Paul Diedrich, Finkenkrug, near Spandau, Germany, assignors to Schering-Kahlbaum A. G., Berlin, Germany No Drawing. Original application June 17, 1931, Serial No. 545,074, and in Germany December 18, 1930. Divided and this application June 6, 1932. Serial No. 615,756

7 Claims. (Cl. 260—42)

Our invention refers to new chemical compounds, being derivatives of the chelidamic acid, and to the method of producing same. These compounds have been found to be particularly useful for pyelographic diagnosis, i. e. in the production of X-ray pictures with intravenous injection of such compound.

We have found that if a silver salt of a di-iodo chelidamic di-alkyl ester having the formula

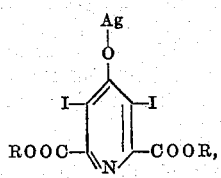

wherein R is an alkyl group, is treated with an alkyl or aralkyl halide, there is obtained an alkyl- or an aralkyl- ether of the di-iodo chelidamic acid di-alkyl esters having the formula

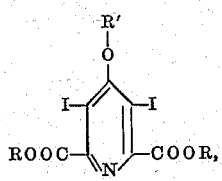

wherein R is an alkyl group, R' an alkyl or an aralkyl group. On saponification with caustic alkali these esters can be converted into the alkali salts of the O-alkyl- and O-aralkyl-di-iodo chelidamic acids, respectively.

The alkali salts of the alkyl-or aralkyl esters of the di-iodo chelidamic acids are colorless salts which very readily dissolve in water.

From their watery solutions hydrochloric acid in excess will liberate the free alkyl and aralkyl ethers, respectively, in the form of colorless crystals, which do not dissolve in water particularly readily and when heated, fuse under liberation of carbonic acid. If ferric chloride is added to their watery solution, a yellow precipitate is obtained.

The silver salts of the di-esters of the di-iodo chelidamic acid can be obtained by dissolving the di-esters in the equivalent quantity of caustic soda and adding the calculated quantity of silver nitrate. Thus for instance the silver salt of di-iodo chelidamic acid di-methyl ester, which forms the starting product in the examples hereinafter recited, may be produced in the following manner:

18.5 grams di-iodo chelidamic acid di-methyl ester are dissolved in 100 ccms. water and 40 ccms. normal caustic soda solution. On a watery solution of 6.8 grams silver nitrate being added, the silver salt separates out in a quantitative manner as a light-gray precipitate.

If the dimethyl ester of di-iodo chelidamic acid is replaced by the di-ethyl-, di-propyl- or some other di-alkyl ester of this acid, one obtains the silver salt of the corresponding di-alkyl esters, to which the method described in the following examples can be applied in an analogous manner.

Example 1

*Methyl ether of the 3.5-di-iodo chelidamic acid*

5 grams of the silver salt of 3.5-di-iodo chelidamic acid di-methyl ester are suspended in 15 ccms. dry xylene and the suspension heated to the boiling point with 2 grams methyl iodide. The solution is filtered while still hot and after the addition of petrol ether the ester separates out under the form of colorless needles, which are re-crystallized from dilute methyl alcohol. Their melting point is somewhere near 150° C.

By saponifying the methyl ether of the 3.5-di-iodo chelidamic acid di-methyl ester with an alcoholic solution of caustic potash the potassium salt, insoluble in alcohol, of the methyl ether of the 3.5-di-iodo chelidamic acid is obtained.

Instead of using an alcoholic solution of caustic potash, we may also saponify with caustic soda or other alkalis and in such case the corresponding alkali metal salts are obtained. The addition of hydrochloric acid to the watery solution of the alkali metal salts causes separation of the methyl ether of the di-iodo chelidamic acid forming colourless needles. This acid is decomposed under separation of carbonic acid, if heated to 176° C. It is soluble in water and an addition of ferric chloride to the watery solution precipitates the insoluble yellow iron salt. By neutralization with caustic alkalis or alkali carbonates the corresponding alkali metal salts are formed.

Example 2

*Ethyl ether of the di-iodo chelidamic acid*

10 grams of the silver salt of di-iodo chelidamic acid di-methyl ester are heated to boiling for 1 hour with 100 ccms. xylene and 3 grams ethyl iodide. The solution is filtered while still hot and after cooling the ethyl ether of the di-iodo chelidamic acid di-methyl ester is precipitated by adding petrol ether. Saponification of the ester, which melts at 131° C. is effected by heating its solution in methyl alcohol with a solution of caustic potash in methyl alcohol. One thus obtains the di-potassium salt of the ethyl ether of the di-iodo chelidamic acid as a precipitate. By adding a dilute mineral acid to the watery solution of this salt, the free acid is obtained which melts at 174° C. under development of carbon dioxide and crystallizes in the form of colorless needles. By neutralization of the free acid with caustic alkalis or alkali carbonates the corresponding alkali metal salts are obtained.

EXAMPLE 3

*Propyl ether of the di-iodo chelidamic acid*

10 grams of the silver salt of di-iodo chelidamic acid di-methyl ester are heated for 1 hour with 3 grams propyl iodide and 100 ccms. xylene. By treating this solution as described with reference to Example 1 the propyl di-iodo chelidamic acid di-methyl ester melting at 89° C. is obtained. By saponification of this ester the propyl ether of the di-iodo chelidamic acid is produced, which crystallizes in the form of cubes and melts at 156° C. under liberation of carbon dioxide.

EXAMPLE 4

*Butyl ether of the di-iodo chelidamic acid*

10 grams of the silver salt of di-iodo chelidamic acid di-methyl ester are boiled for 1 hour with 3.5 grams butyl iodide and 100 ccms. xylene. On the solution being treated as described with reference to Example 1 the butyl ether of the di-iodo chelidamic acid di-methyl ester is obtained, which melts at 82° C. The butyl ether of the di-iodo chelidamic acid, which crystallizes under the form of needles, melts at 145° C.

EXAMPLE 5

*Benzyl ether of the di-iodo chelidamic acid*

10 grams of the silver salt of di-iodo chelidamic acid di-methyl ester are heated to boiling for 1 hour with 2.5 grams benzyl chloride and 100 ccms. xylene. By treating the solution as described with reference to Example 1 the benzyl ether of the di-iodo chelidamic acid di-methyl ester is obtained, which melts somewhere about 120° C. From this ester may be produced by saponification the benzyl ether of the di-iodo chelidamic acid, which crystallizes in needles and melts at 167° C. under liberation of carbon dioxide.

In a similar manner alkyl ethers of the di-iodo chelidamic acid with non-saturated hydrocarbon radicals such as for instance allyl can be produced.

EXAMPLE 6

*Allyl ether of the di-iodo chelidamic acid*

10 grams of the silver salt of di-iodo chelidamic acid di-methyl ester are heated for 1 hour with 3 grams allyl iodide and 100 ccms. xylene. By treating the solution as described with reference to Example 1 the allyl ether of the di-iodo chelidamic acid di-methyl ester melting at 98° C. is obtained, which may be converted by saponification into the allyl ether of the di-iodo chelidamic acid, which crystallizes in the form of needles and melts under decomposition at 143–144° C.

Various changes may be made in the details disclosed in the foregoing specification without departing from the invention or sacrificing the advantages thereof.

We claim:—

1. Compounds having the formula

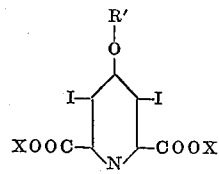

wherein R' is an alkyl or benzyl group and X is a typical hydrogen atom, which may also be replaced by an alkali metal, these compounds, if X is hydrogen, being colorless acids, which dissolve in water only with some difficulty and, when heated, melt under liberation of carbon dioxide, the addition of ferric chloride to the watery solutions resulting in yellow precipitates.

2. The alkali metal salts of the alkyl ethers of the di-iodo chelidamic acids having the formula

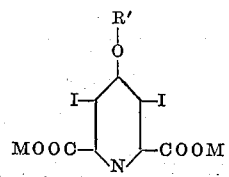

wherein R' is an alkyl group, while M is an alkali metal, these salts being very readily soluble in water, the addition of hydrochloric acid in excess to their watery solutions causing precipitation of the free alkyl ethers of the di-iodo chelidamic acids.

3. The alkali metal salts of the benzyl ethers of the di-iodo chelidamic acids having the formula

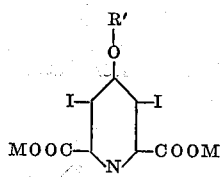

wherein R' is a benzyl group, while M is an alkali metal, these salts being very readily soluble in water, the addition of hydrochloric acid in excess to their watery solutions causing precipitation of the free benzyl ethers of the di-iodo chelidamic acids.

4. The sodium salts of the alkyl ethers of the di-iodo chelidamic acids having the formula

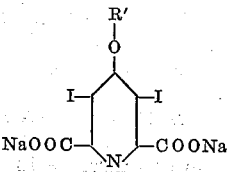

wherein R' is an alkyl group, these salts being very readily soluble in water, the addition of hydrochloric acid in excess to their watery solutions causing precipitation of the free alkyl ethers of the di-iodo chelidamic acids.

5. The sodium salts of the benzyl ethers of the di-iodo chelidamic acids having the formula

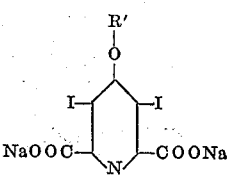

wherein R' is a benzyl group, these salts being very readily soluble in water, the addition of hydrochloric acid in excess to their watery solutions causing precipitation of the free benzyl ethers of the di-iodo chelidamic acids.

6. The alkali metal salts of methyl ether of the di-iodo chelidamic acid, having the formula

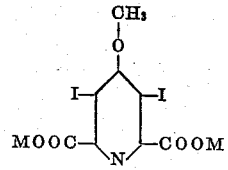

wherein M is an alkali metal, the salts being readily soluble in water, an addition of hydrochloric acid in excess to the watery solutions causing precipitation of the free methyl ether of the di-iodo chelidamic acid forming colorless needles, which are comparatively readily soluble in water, and melting at 176° C. under liberation of carbon dioxide, the addition of ferric chloride to the watery solution of the acid causing precipitation of the insoluble yellow iron salt.

7. The alkali metal salts of ethyl ether of the di-iodo chelidamic acid, having the formula

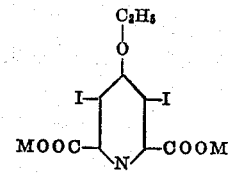

wherein M is an alkali metal, the salts being readily soluble in water, an addition of hydrochloric acid in excess to the watery solutions causing precipitation of the free ethyl ether of the di-iodo chelidamic acid forming colorless needles, which are comparatively readily soluble in water, and melting at 174° C. under liberation of carbon dioxide, the addition of ferric chloride to the watery solution of the acid causing precipitation of the insoluble yellow iron salt.

MAX DOHRN.
PAUL DIEDRICH.